United States Patent [19]
Onofrio

[11] Patent Number: 5,898,987
[45] Date of Patent: May 4, 1999

[54] METHOD OF INSTALLING ACOUSTICAL CEILING GRID

[76] Inventor: Daniel Onofrio, 109 Scantic Rd., East Windsor, Conn. 06088

[21] Appl. No.: 08/851,225

[22] Filed: May 5, 1997

Related U.S. Application Data

[63] Continuation-in-part of application No. 08/571,764, Dec. 13, 1995, Pat. No. 5,702,218.

[51] Int. Cl.$^6$ .............................. B23P 11/00; E04B 9/18; E04G 23/00
[52] U.S. Cl. ..................... 29/446; 29/525.02; 52/733.1; 52/506.06; 52/745.21
[58] Field of Search ................... 29/446, 525.01, 29/525.02, 525.04, 897.3; 52/733.1, 506.06, 506.07, 745.21; 411/340, 341, 343–345, 387, 552

[56] References Cited

U.S. PATENT DOCUMENTS 3,066,775  12/1962  Valsvik .................... 52/733.1

FOREIGN PATENT DOCUMENTS

| | | | |
|---|---|---|---|
| 548905 | 11/1959 | Belgium .......................... | 52/506.06 |
| 84966 | 6/1958 | Denmark ......................... | 52/506.06 |
| 3801135 | 5/1989 | Germany .......................... | 52/733.1 |
| 407485 | 8/1966 | Switzerland .................... | 52/506.06 |
| 944068 | 12/1963 | United Kingdom ............. | 52/506.06 |
| 2249578 | 5/1992 | United Kingdom ............. | 52/506.06 |

*Primary Examiner*—S. Thomas Hughes
*Attorney, Agent, or Firm*—St. Onge Steward Johnston & Reens

[57] ABSTRACT

A method of installing a grid for an acoustical ceiling to an existing ceiling, which eliminates the need for time-consuming manipulation of a fastener nut, makes use of a toggle fastener having a shaft with a stop collar at one end, with a spring loaded wing toggle at the other end, and a firestop element slidable along the shaft between the stop collar and the wing toggle, which is biased towards the wing toggle by a spring that is located on the shaft between the firestop element and the stop collar. The method comprises forming a hole in the existing ceiling; inserting the toggle fastener into the hole from the first side of the existing ceiling, until the wing toggle passes through the hole and reopens, with the firestop element remaining pressed against the existing ceiling by the spring to provide a positive closure of the hole in the existing ceiling; and affixing the grid for an acoustical ceiling to the toggle fastener. The firestop element may be a flat washer or a self-centering conically shaped washer.

13 Claims, 3 Drawing Sheets

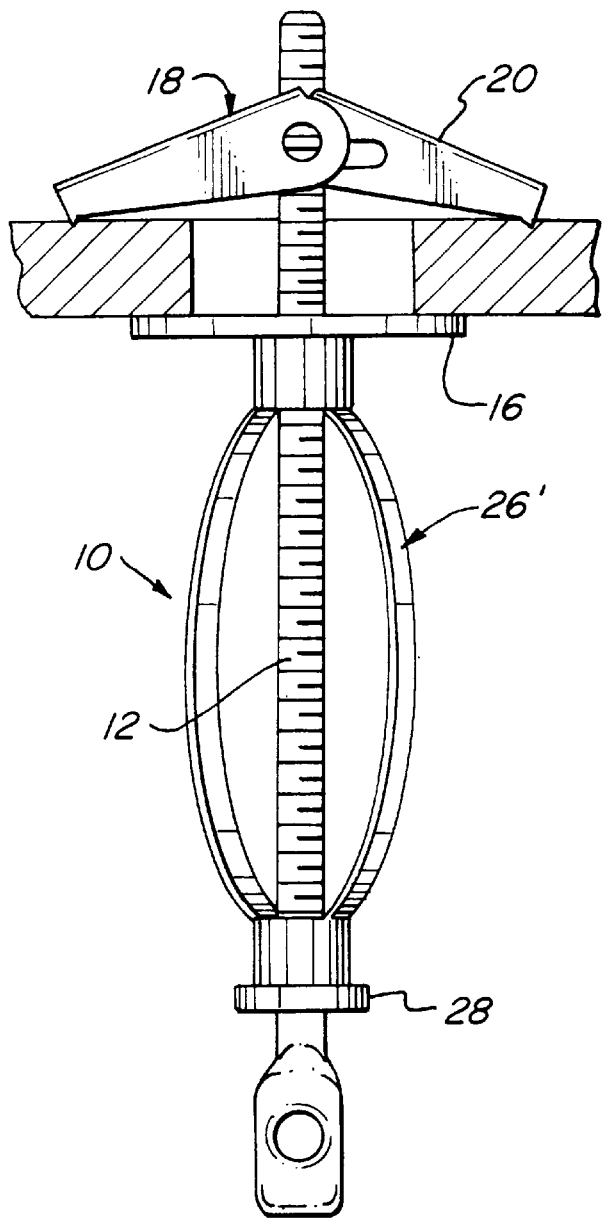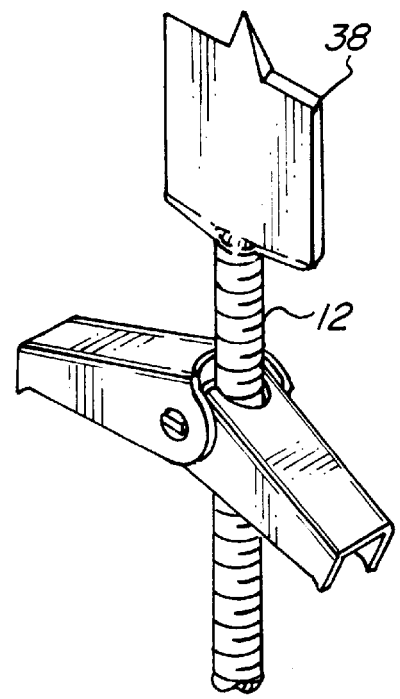
FIG. 8
FIG. 9

METHOD OF INSTALLING ACOUSTICAL CEILING GRID

The present application is a continuation-in-part of U.S. patent application Ser. No. 08/571,764, filed Dec. 13, 1995, now U.S. Pat. No. 5,702,218, in the name of Daniel Onofrio, and entitled "Improved Fastener."

FIELD OF THE INVENTION

This invention relates to a method of installing a grid for an acoustical ceiling to a preexisting drywall or plaster ceiling.

BACKGROUND OF THE INVENTION

In remodelling of older offices, a frequent improvement is the addition of an acoustical tile ceiling or "drop ceiling." Such acoustical tile ceilings typically involve a grid or framework which is hung from the existing ceiling, and into which are placed acoustical ceiling tiles.

The grid or framework is typically hung from the existing ceiling using a toggle bolt of the type illustrated as toggle bolt 100 in FIG. 1. Toggle fastener 100 typically consists of a bolt 102 onto which is mounted a nut 104 and a washer 106, and a spring-loaded wing toggle 108. The correct method of installing such toggle bolts 100 is to drill a hole in the existing ceiling and to insert the fastener 100 into the hole, causing toggle wings 110 to be compressed against the bolt 102, until the wing toggle 108 exits the other side of the existing ceiling, whereupon the wings 110 expand preventing the toggle fastener 100 from being pulled back through the hole.

It is to be appreciated that prior to insertion of the toggle bolt 100 into the hole, that it is often necessary to back the nut 104 away from the toggle 108 to provide clearance for the wings 110 to be folded back in order to insert the toggle through the hole. This can add significantly to the time needed to install the toggle.

After the toggle wings 110 are opened, in the correct method of installation, the nut 104 and washer 106 are advanced until tight against the ceiling. It is typically a fire code requirement that such washers 106 be advanced until flush against the ceiling to block the open channel, formed by making the ceiling hole, into the open plenum above the existing ceiling, to minimize risk of a fire spreading upwardly through a building. In addition, it is desirable to tighten the nut and washer to insure that the toggle bolt 100 is tightly secured to the ceiling.

The new acoustical ceiling grid is then hung by a wire element passed through the opening 112 in the end of bolt 102 and which is twisted around the gridwork.

While the method using the prior art toggle fastener 100 is effective to hang an acoustical ceiling gridwork, it is time consuming. In particular, the steps of backing the nut 104 away from the toggle 108 and then advancing the nut 104 to correctly install the washer as an effective firestop require significant amounts of time, especially when it is considered that building code requirements typically require use of at least 16 such fasteners per each 10 foot by 10 foot square area of ceiling, such that hundreds of such fasteners will be required for a commercial construction project. It is to be appreciated that the thickness of the existing ceiling may be greater than expected and significant time may be spent in backing off and adavancing the nut.

A potentially dangerous problem also arises with the method of installing acoustical ceilings using such prior art fasteners 100. In particular, to save time (and cost), installers frequently do not completely tighten the nut 104 and washer 106 against the drywall ceiling panel, thereby leaving an open passageway between the two sides of the existing ceiling, which as noted above, is a fire code violation. An incomplete firestop also can arise if the mounted toggle bolt is not properly centered in the hole in the ceiling, as the washer in the conventional toggle fastener will typically be sized to cover a standard hole size, but if the axis of the fastener 102 is offset from the center of the hole, the washer is typically too small to cover the entire hole. This problem can arise both through incorrect initial installation, or vibration, or because the toggle bolt is bumped or wiggled, as such mechanical impact can cause the toggle bolt 100 to change position so that the washer is no longer centered on the hole. It is to be appreciated that in construction projects such impacts can occur easily though being bumped with ladders or scaffolding, or other ways.

An example of a device which avoids some of the problems of previous designs is U.S. Pat. No. 4,286,497 to Shamar which discloses a toggle fastener with a plastic ratchet assembly for quickly tightening the toggle and washer against a panel. In the Shamar device, the ratchet assembly consists of two plastic strips attached to the spring-loaded toggle. The strips pass through slots in a plastic washer and include ratchet ridges. The slots in the plastic washer are designed to allow the washer to slide over the strips in the direction of the toggle. To install the Shamar device, the toggle is compressed and inserted into a blind hole. The strips are inserted into the washer and the ends are pulled apart thereby sliding the washer toward the panel and toggle, and securing the fastener to the panel. A means to hang a drop ceiling, such as a bolt, may then be threaded through the center of the plastic washer.

While the Shamar device does decrease the time and effort necessary to tighten a fastener, the design does not meet building and fire codes which prohibit the use of plastic fasteners. Moreover, the amount by which the Shamar device may be tightened is limited by the amount of tension that the installer can generate in the strips and by the amount of tension that the strips may withstand. Also, the Shamar device as well as the prior art device of FIG. 1 do not provide for any self-centering or resiliency once tightened. Any substantial movement of the above described fasteners would cause permanent loss of rigidity and would likely damage either the fastener, the panel, or both, and/or create a passage for fire.

Another example of a prior device is U.S. Pat. No. 4,600,344 to Sutenbach which discloses a push-on plastic wing-nut fastener. This device also decreases the assembly and installation time as compared to conventional toggle fasteners, however as above, building and fire codes would likely not permit its use in general construction and its rigidity and resiliency is limited.

What is desired therefor is a method of mounting a grid for an acoustical ceiling to an existing ceiling which requires a minimum amount of assembly and installation time, which provides a nearly fool-proof fire stop to insure compliance with applicable building and fire codes, and which is rigid once installed yet allows for some resilient deflection that does not cause the firestop washer to be displaced so that the ceiling hole leaves an open passageway for fire.

SUMMARY OF THE INVENTION

It is an object of the invention to provide a method of mounting a grid for an acoustical ceiling to an existing ceiling with a minimum amount of time and effort.

Another object of the invention is to provide a method of mounting a grid for an acoustical ceiling to an existing ceiling that automatically locates a firestop element such as a washer against the existing ceiling.

A further object of the invention is to provide such a method which automatically closes the passageway through the existing ceiling, and maintains a positive closure even if the toggle fastener is disturbed.

A further object of the invention is to provide such a method which is adapted to installation of a grid for an acoustical ceiling to an existing ceiling that accommodates that the existing ceiling is of indeterminate thickness and/or may have a varying thickness.

A further object of the invention is to provide such a method in which the fastener used can be self-centering in the ceiling aperture to prevent occurrences of passageways in the ceiling arising from an uncentered fastener.

Yet another object of the invention is to provide such a method that also permits of manually increasing the tightness of the fastener to the existing ceiling.

The above and other objects are achieved with the method of the present invention for installing a grid for an acoustical ceiling to an existing ceiling, comprising the steps of: forming a hole in the existing ceiling; inserting a toggle fastener into the hole from the first side of the existing ceiling, the toggle fastener including: a shaft having first and second end portions; a spring loaded wing toggle mounted to the shaft near to the second end portion of the shaft; a stop collar located near to the first end portion of the shaft; a firestop element fitted onto the shaft between the wing toggle and the stop collar; and a spring element extending between the stop collar and the firestop element to bias the firestop element towards the wing toggle; the second end portion and the wing toggle passing through the hole to compress the wing toggle, the wing toggle expanding on the second side of the existing ceiling subsequent to passage through the hole to prevent the toggle fastener from being removed from the existing ceiling; the firestop element remaining on the first side of the existing ceiling, the firestop element being pressed against the first side of the ceiling by the spring element to provide a positive closure of the hole in the ceiling; and affixing the grid for an acoustical ceiling to the toggle fastener.

Preferably, the toggle fastener further comprises an aperture located at the first end portion of the bolt and the step of affixing the grid for an acoustical ceiling to the toggle fastener comprises connecting a wire element which extends through the aperture to the grid.

Preferably, the method further comprises the step of self-centering of the firestop element in the hole in the ceiling. In the preferred embodiment, the step of self-centering of the firestop element in the ceiling is accomplished through a firestop element having a flat peripheral portion and a generally conically-shaped center portion extending towards the second end of the shaft, the conically-shaped center portion being seated in the hole in the existing ceiling by pressure of the spring element against the firestop element.

In one embodiment, the step of forming the hole in the ceiling comprises drilling, and the second end portion of the toggle fastener comprises a self-drilling tip portion. In this method, the toggle fastener acts both as drill and fastener, and can be rotated by a power tool to drill through and be inserted into the ceiling.

Most preferably, the method further includes a step of tightening the fastener once it is installed in the existing ceiling. Preferably, the shaft of the toggle fastener is threaded, and the winged toggle includes a threaded nut matingly mounted to the threaded shaft. The toggle fastener may be securely mounted to the existing ceiling by rotation of the shaft relative to the threaded nut to advance the stop collar toward the existing ceiling to compress the spring element, increasing the pressure of the firestop element against the existing ceiling.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 8 is a side view of an alternative embodiment of a toggle fastener used in the method of the invention.

FIG. 9 is a side view of a self-drilling point in a fastener used in accordance with a further embodiment of the method of the invention.

DETAILED DESCRIPTION OF THE INVENTION

Figure 1:
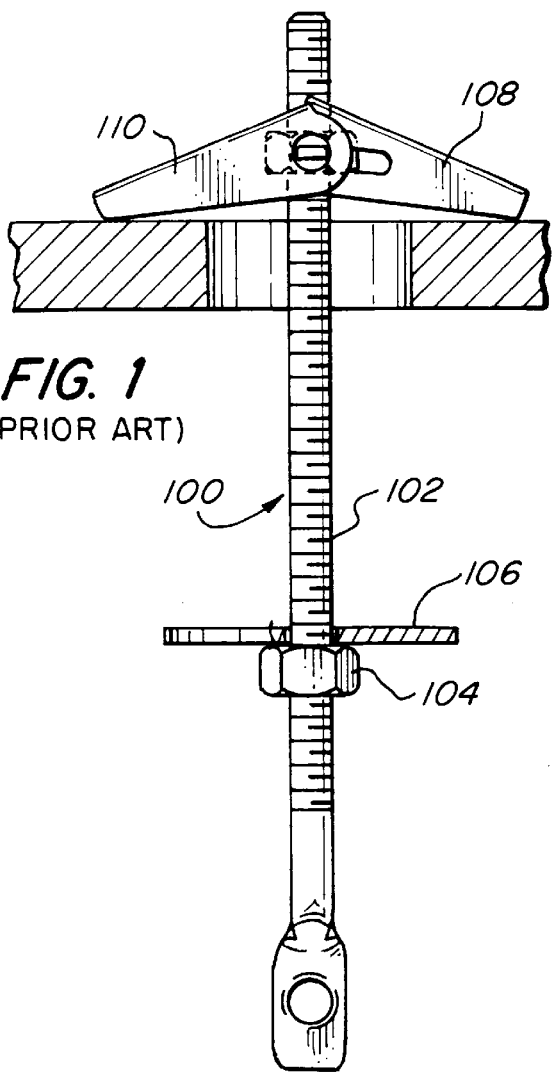
FIG. 1 is a side view of a prior art toggle fastener.

Referring to FIGS. 2–9, where like elements are identified by the same reference numerals, a toggle fastener 10 includes a threaded bolt 12, a firestop element 16, a spring-loaded toggle 18, a spring 26 and a stop collar 28. The fastener 10 further includes means for attachment, such as aperture 27, to a grid 40 or framework for an acoustical ceiling, which can receive a wire element 42 which is then secured to the grid or framework.

To install the toggle fastener 10 of the present invention, a hole or passageway 22 is cut in existing ceiling 24 from its first side 25. As used herein "existing ceiling" means a preexisting plaster, drywall, or acoustical ceiling to which is intended to be affixed the grid for a new acoustical ceiling. The toggle 18 is then inserted through the hole 22, causing the wings 20 of the toggle 18 to be folded inward toward the bolt 12 to permit the toggle 18 to pass through hole 22. As toggle 18 passes through hole 22 the firestop element 16 contacts the existing ceiling 24; further advancing of the toggle 18 causes the spring 26 to compress, allowing the firestop element 16 to move away from the toggle 18. When the toggle 18 passes entirely through the hole 22 to the second side 29 of ceiling 24, the wings 20 expand to anchor the toggle at the blind side of the existing ceiling 24. The spring 26 expands to snugly press the firestop element 16 against the existing ceiling 24 and secure the toggle fastener 10. This occurs because the stop collar 28 limits the movement of one end 30 of the spring 26 while the other end 32 of spring 26 extends the length of the bolt 12 and maintains pressure against the firestop element 16 and existing ceiling 24 when the fastener 10 is installed. It is to be appreciated that the significant portion of the time required for installation of prior devices—the initial retraction of the nut to provide clearance for the wings, as well as the advancing of the nut to press the firestop element 16 against the existing ceiling 24—is avoided. The fastener 10 in the method accomodates existing ceilings of various thicknesses without the time required to adjust the position of the firestop washer as in the prior art methods. Moreover, the hole 22 is automatically closed to maximize the chances of a positive fire stop.

A further benefit of the invention is that it tends to reduce migratory sounds. Migratory sounds are sounds travelling in the plenum above the ceiling, such as HVAC noises. The problem of incomplete advancement of the washer in existing conventional toggle bolts to close the ceiling hole, as described above, permits entry of annoying sounds into the workplace. The present invention helps to eliminate such noises by maximizing the chances that the ceiling hole is properly closed.

To assemble the toggle fastener, only the toggle 18 need be threaded over the bolt 12. The other elements—the stop collar 28, spring 26 and firestop element 16—are not threaded and can be quickly disposed over the bolt 12. A significant portion of the time required for prior art methods such as adjusting the location of the nut used to locate the washer is eliminated.

Figure 4:
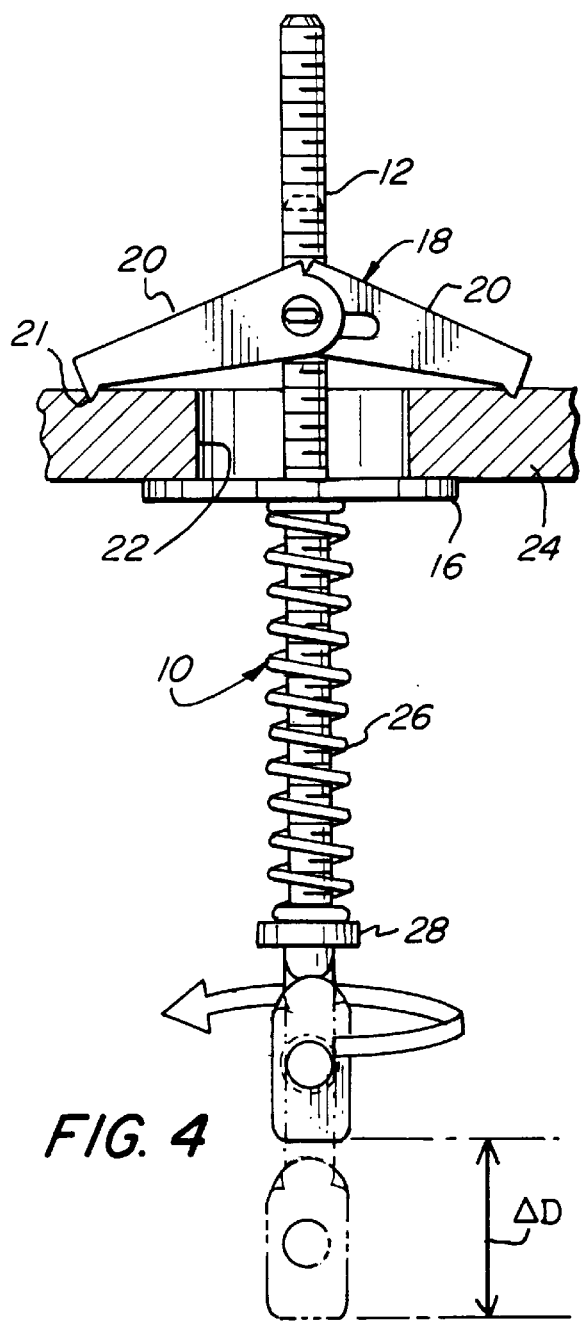
FIG. 4 is a side view of the fastener of FIG. 2 showing the step of manually rotating the threaded bolt to increase the tightness of the fastener once installed and/or to adjust the position of the bolt lower end.
Figure 7:
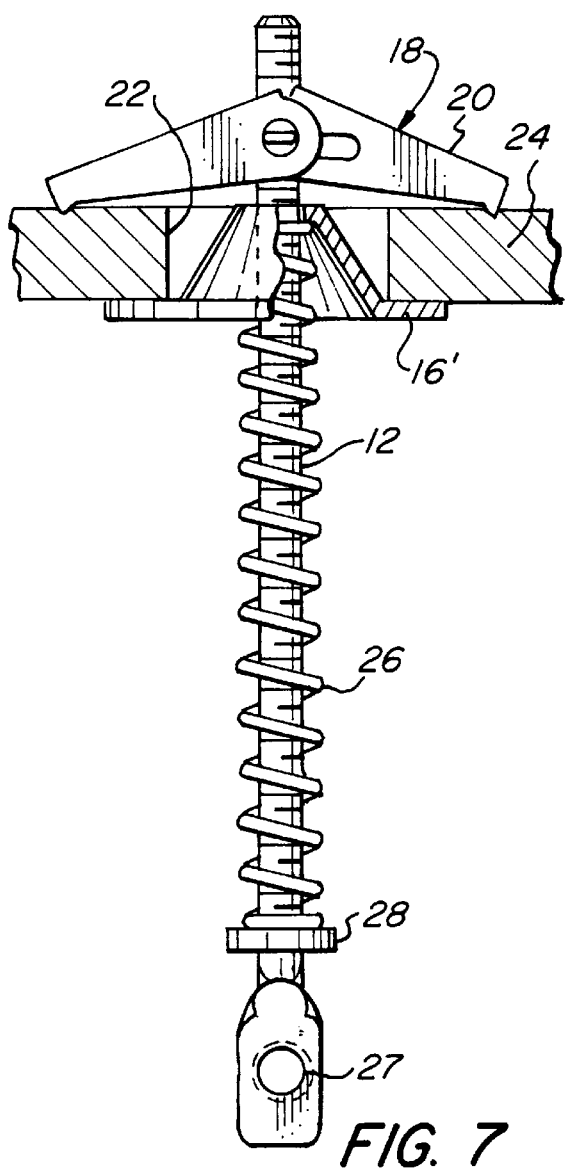
FIG. 7 is a side view of the embodiment of the toggle fastener with a self-centering firestop element used in the method of the present invention.
Figure 6:
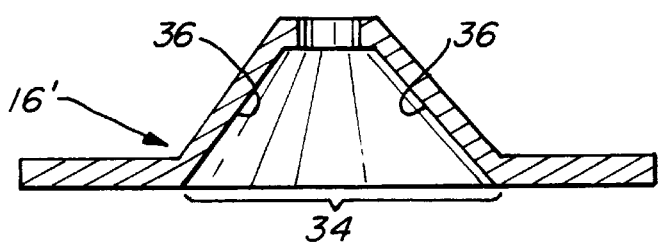
FIG. 6 is a side view of the self-centering firestop element used in the toggle fastener used in the method of the present invention.

Referring to FIG. 4, after installation, the toggle fastener 10 of the present invention can be manually tightened by rotating the threaded bolt 12. This tightens the device because the wings 20 of the toggle 18 frictionally engage the existing ceiling 24 and prevent the toggle 18 from rotating along with the bolt 12. In an alternative embodiment, wings 20 may be provided with sharpened points 21 to enhance the anchoring of the wings 20 in the existing ceiling 24. Since the toggle 18 is threaded to the bolt 12, clockwise rotation of bolt 12 will cause the distance between the toggle 18 and the stop collar 28 to decrease the distance by ΔD thereby increasing the compression of the spring 26 and the force which is applied to the existing ceiling 24. The tightening also permits adjustment of the height of the aperture 27 at the first end 30 of bolt 12 for leveling of a panel grid 40 or framework to be hung from the aperture 27.

Importantly, while the toggle fastener 10 is securely attached to the existing ceiling 24, since the spring 26 is not fully compressed, the toggle fastener 10 retains some resiliency. That is, it may be displaced (inwardly or sideways) somewhat without damage to the fastener or the panel, and, once the displacing force is gone, it will resume its original position without any loss of the flush fitting of the firestop element against the existing ceiling. This is a significant improvement over the prior art standard toggle bolt, which often would become uncentered in the hole in the ceiling, leaving the hole uncovered. As noted above, such shifting often occurred through incorrect initial installation, or vibration, or because the toggle bolt is bumped or wiggled with ladders or scaffolding, or other ways.

The present invention also reduces loss of closure of the ceiling hole that would occur with the conventional prior art toggle bolts due to vibration causing loosening of the nut holding the firestop washer in place. The spring 26 automatically adjusts the firestop element 16 so it is always snug against the ceiling. This is a significant improvement over the prior art standard toggle bolt, which often would become loose over time.

Figure 2:
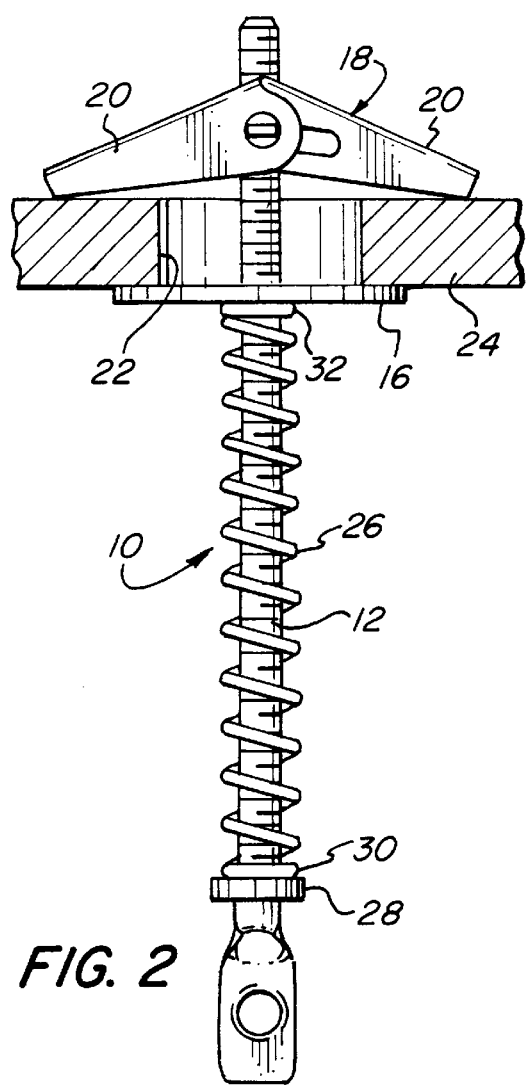
FIG. 2 is a side view of the toggle fastener used in the method of the present invention showing the fastener mounted to a ceiling.
Figure 5:
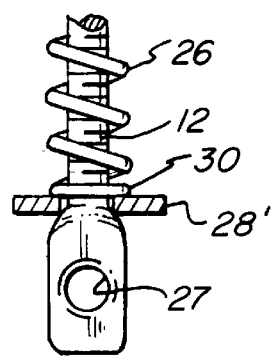
FIG. 5 is a side, close-up view of an embodiment of the fastener of FIG. 2 showing a stop collar consisting of a standard washer.
Figure 3:
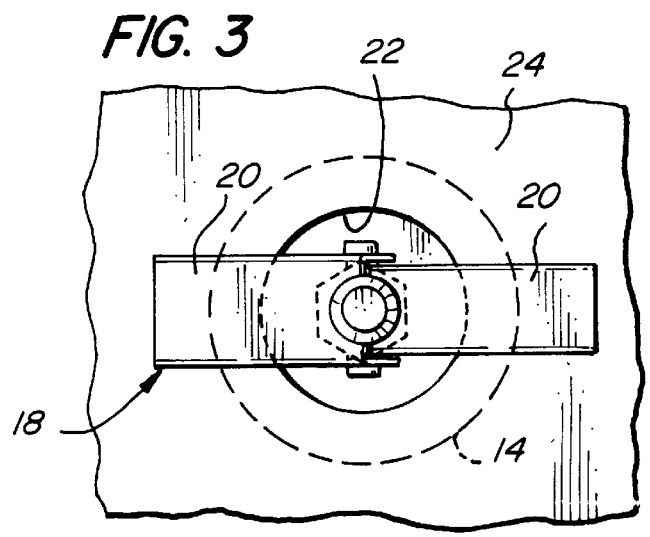
FIG. 3 is a top view of the fastener of FIG. 2.

Referring to FIG. 2, the stop collar 28 preferably is a circular flange formed integrally and in one piece with the bolt 12; alternatively, as shown in FIG. 5, the stop collar may comprise a stop washer 28' placed over the bolt 12; in other embodiments the stop collar may comprise two or more tabs extending radially from bolt 12, and as described above, may be formed integrally with or separate from the bolt 12. Alternatively, another portion of the bolt may act as a stop for the spring.

Firestop element 16 may be a flat annular washer, as shown in FIG. 2. However, in a preferred embodiment, shown in FIGS. 6 and 7, the firestop element consists of a self-centering washer 16' having a conically-shaped center portion 34. Firestop elements 16, and 16', have center apertures which are greater in diameter than the diameter of bolt 12 so that the firestop element can move freely along the length of bolt 12. As used herein, the term "conically-shaped" includes frustoconical shapes, bell shapes, and other tapered cross-sectional shapes having the ability to center the washer 16' on hole 22. This self-centering feature is very effective in minimizing open holes in the existing ceiling that can arise from lateral displacement of the installed toggle fastener 10 from mechanical impacts and vibration. The self-centering feature arises because the walls 36 of the conical center portion 34 serve to urge the toggle fastener 10 toward the center axis of the hole 22 when washer 16' is inserted in hole 22.

The spring 26 is preferably a coil spring fitted onto bolt 12; however, as shown in FIG. 8, the spring 26' may be a flat spring or springs with apertures at each end thereof through which extends bolt 12. As seen in FIG. 2, the first end portion 30 of spring 26 is located adjacent stop collar 28. The second end portion 32 is adjacent firestop element 16. The springs 26,26' serve the function of biasing the firestop element 16,16' towards the wing toggle 18 to provide the automatic closure of hole 22 and secure mounting of the fastener as described herein.

If desired, a self drilling point 38 may be provided at the upper end of bolt 12, as shown in FIG. 9. The self drilling point may be a hole drill as illustrated, or a hole saw tip. This self drilling point is useful to permit the fastener 10 to be installed using a lag driver or other power tools, without need for making a hole 22 by prior drilling or punching of the hole.

To summarize the invention, the method of installing a grid 40 for an acoustical ceiling to an existing ceiling 24 having a first side 25 and a second side 29, comprises the steps of: (1) forming a hole 22 in the existing ceiling 24; (2) inserting toggle fastener 10 into hole 22 from the first side 25 of the existing ceiling 24, until the wing toggle passes through the hole and reopens, with the firestop element remaining pressed against first side 25 of the existing ceiling 24 by the spring 26 to provide a positive closure of the hole 22 in the existing ceiling 24; and (3) affixing the grid 40 for an acoustical ceiling to the toggle fastener 10. The step of affixing the grid 40 to the toggle fastener 10 will preferably be accomplished by means of a wire element 42 inserted into aperture 27 and then secured to the grid. It is to be appreciated that the "wire element" may comprise any number of possible flexible connections that can be used in hanging the grid 40 from the toggle fastener 10, including, without limitation, rope, monofilament, wire, twisted wire, cable, plastic coated wires (such as a "twist tie"), and locking plastic wire elements, such as are typically used in bundling electrical wires and cables, that include a strap that passes through a loop in one end of the strap and that is prevented from removal from the loop by locking teeth elements.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of installing a grid for an acoustical ceiling to an existing ceiling having a first side and a second side, comprising the steps of:

forming a hole in the existing ceiling;

inserting a toggle fastener into said hole from said first side of said existing ceiling, said toggle fastener including: a shaft having first and second end portions; a spring loaded wing toggle mounted to said shaft near to said second end portion of said shaft; a stop collar located near to said first end portion of said shaft; a firestop element fitted onto said shaft between said wing toggle and said stop collar; and a spring element extending between said stop collar and said firestop element to bias said firestop element towards said wing toggle;

said second end portion and said wing toggle passing through said hole to compress said wing toggle, said wing toggle expanding on said second side of said existing ceiling subsequent to passage through said hole to prevent said toggle fastener from being removed from said existing ceiling;

said firestop element remaining on said first side of said existing ceiling, said firestop element being pressed against said first side of said existing ceiling by said spring element to provide a positive closure of said hole in said existing ceiling; and affixing the grid for an acoustical ceiling to said toggle fastener.

2. A method in accordance with claim 1, wherein said toggle fastener further comprises an aperture located at said first end portion of said bolt and said step of affixing said grid for an acoustical ceiling to said toggle fastener comprises connecting a wire element which extends through said aperture to said grid.

3. A method in accordance with claim 1, further comprising the step of self-centering of said firestop element in said hole in said existing ceiling.

4. A method in accordance with claim 3, wherein said step of self-centering of said firestop element in said existing ceiling is accomplished through a firestop element having a flat peripheral portion and a generally conically-shaped center portion extending towards said second end of said shaft, said conically-shaped center portion being seated in said hole in said existing ceiling by pressure of said spring element against said firestop element.

5. A method in accordance with claim 1, wherein said step of forming said hole in said existing ceiling comprises drilling, and wherein said second end portion of said toggle fastener comprises a self-drilling tip portion, said toggle fastener being rotated by a power tool to drill through said existing ceiling.

6. A method in accordance with claim 1, wherein said shaft of said toggle fastener further comprises a threaded shaft, and said winged toggle further comprises a threaded nut matingly mounted to said threaded shaft, said method further comprising the step of tightening the toggle fastener to securely mount said toggle fastener to said existing ceiling by rotation of said shaft relative to said threaded nut to advance said stop collar toward said existing ceiling to compress said spring element to increase the pressure of said firestop element against said existing ceiling.

7. A method of installing a grid for an acoustical ceiling to an existing ceiling having a first side and a second side, comprising the steps of:

forming a hole in said existing ceiling;

inserting a toggle fastener into said hole from said first side of said existing ceiling, said toggle fastener including: a shaft having first and second end portions; a spring loaded wing toggle mounted to said shaft near to said second end portion of said shaft; a stop collar located near to said first end portion of said shaft; a firestop element fitted onto said shaft between said wing toggle and said stop collar; and a spring element extending between said stop collar and said firestop element to bias said firestop element towards said wing toggle;

said second end portion and said wing toggle passing through said hole to compress said wing toggle, said wing toggle expanding on said second side of said existing ceiling subsequent to passage through said hole to prevent said toggle fastener from being removed from said existing ceiling;

said firestop element remaining on said first side of said existing ceiling, said firestop element having a flat peripheral portion and a generally conically-shaped center portion extending towards said second end of said shaft, said firestop element being self-centering in said hole in said existing ceiling by seating of said conically-shaped center portion in said hole in said existing ceiling by pressure of said spring element against said firestop element, said firestop element being pressed against said first side of said existing ceiling by said spring element to provide a positive closure of said hole in said existing ceiling; and affixing the grid for an acoustical ceiling to said toggle fastener, by connecting a wire element extending through an aperture located at said first end portion of said bolt to said grid.

8. A method in accordance with claim 7, wherein said shaft of said toggle fastener further comprises a threaded shaft, and said winged toggle further comprises a threaded nut matingly mounted to said threaded shaft, said method further comprising the step of tightening the toggle fastener to securely mount said toggle fastener to said existing ceiling by rotation of said shaft relative to said threaded nut to advance said stop collar toward said existing ceiling to compress said spring element to increase the pressure of said firestop element against said existing ceiling.

9. A method in accordance with claim 7, wherein said step of forming said hole in said existing ceiling comprises drilling, and wherein said second end portion of said toggle fastener comprises a self-drilling tip portion, said toggle fastener being rotated by a power tool to drill through said existing ceiling.

10. A method in accordance with claims 1, 2, 5 or 6, wherein said firestop element comprises a flat washer.

11. A method in accordance with claims 1, 2, 3, 4, 5, 6, 7, 8 or 9, wherein said stop collar is integrally formed in one piece with said shaft.

12. A method in accordance with claims 1, 2, 3, 4, 5, 6, 7, 8 or 9, wherein said stop collar comprises a washer disposed over said shaft and further comprising, at said second end portion of said shaft, a means to limit the movement of said washer.

13. A method in accordance with claims 1, 2, 3, 4, 5, 6, 7, 8 or 9, wherein said spring element comprises a coil spring, and said shaft extends through a center portion of said coil spring.

* * * * *